(12) United States Patent
Hsu

(10) Patent No.: US 9,503,012 B1
(45) Date of Patent: Nov. 22, 2016

(54) DYNAMIC INDUCTOR SYSTEM

(71) Applicants: Fu-Tzu Hsu, Taipei (TW); Chieh-Sen Tu, New Taipei (TW)

(72) Inventor: Fu-Tzu Hsu, Taipei (TW)

(73) Assignees: Fu-Tzu Hsu, Taipei (TW); Chieh-Sen Tu, New Taipei (TW)

( * ) Notice: Subject to any disclaimer, the term of this patent is extended or adjusted under 35 U.S.C. 154(b) by 0 days.

(21) Appl. No.: 15/138,862

(22) Filed: Apr. 26, 2016

(30) Foreign Application Priority Data

Jul. 9, 2015 (TW) .............................. 104122364 A

(51) Int. Cl.
*H02P 6/00* (2016.01)
*H02P 27/06* (2006.01)
*H02J 7/00* (2006.01)

(52) U.S. Cl.
CPC ............. *H02P 27/06* (2013.01); *H02J 7/0052* (2013.01)

(58) Field of Classification Search
CPC .................. H01L 2924/0002; H01L 2924/00; H02M 3/158; H01M 10/625; H01M 10/615
See application file for complete search history.

(56) References Cited

U.S. PATENT DOCUMENTS

| | | | | |
|---|---|---|---|---|
| 2007/0145946 A1* | 6/2007 | Chiang | ................. | H02J 7/0019 320/118 |
| 2007/0246943 A1* | 10/2007 | Chang | ..................... | H02J 3/28 290/44 |
| 2014/0265947 A1* | 9/2014 | Hsu | ...................... | H02P 25/184 318/139 |

* cited by examiner

*Primary Examiner* — Shawki S Ismail
*Assistant Examiner* — Zoheb Imtiaz
(74) *Attorney, Agent, or Firm* — Hamre, Schumann, Mueller & Larson, P.C.

(57) ABSTRACT

A dynamic inductor system capable of storing usable electrical energy includes a rotor, a stator, a three-phase winding set, and a damping circuit. The damping circuit includes three freewheeling diode sets. Each of the three freewheeling diode sets has a first freewheeling diode and a second freewheeling diode. When the rotor rotates around the stator, the three-phase winding set generates a current passing through the first freewheeling diode of one of the freewheeling diode sets to charge the first damping capacitor, and a current passing through the second freewheeling diode of another one of the freewheeling diode sets to charge the second damping capacitor.

5 Claims, 6 Drawing Sheets

US 9,503,012 B1

DYNAMIC INDUCTOR SYSTEM

CROSS-REFERENCE TO RELATED APPLICATION

This application claims priority of Taiwanese Application No. 104122364, filed on Jul. 9, 2015.

FIELD

The disclosure relates to a dynamic inductor system, and more particularly to a dynamic inductor system capable of storing usable electrical energy.

BACKGROUND

A driving circuit of a three-phase brushless direct current (BLDC) motor is configured to be electrically connected to a direct current (DC) source and to control the three-phase BLDC motor to rotate. The three-phase BLDC motor includes a three-phase winding set that will instantaneously generate counter-electromotive force upon demagnetization of a coil of the three-phase winding set, generating a current with high voltage. The current may flow to the DC source, and thus, the DC source may be damaged due to the high voltage of the current.

SUMMARY

Therefore, an object of the disclosure is to provide a dynamic inductor system that can alleviate at least one of the drawbacks of the prior arts.

According to the disclosure, the dynamic inductor system includes a rotor, a stator, a three-phase winding set and a damping circuit. The three-phase winding set is disposed at one of the rotor and the stator, and includes three coils. The coils are electrically connected to each other in a Y circuit configuration that has a central point and three end points. The damping circuit includes three freewheeling diode sets, a first damping capacitor and a second damping capacitor. Each of the three freewheeling diode sets is configured to be electrically connected to a direct current (DC) source in parallel. Each of the three freewheeling diode sets has a first freewheeling diode and a second freewheeling diode electrically connected to each other in series at a common node that is electrically connected to a respective one of the end points. The first damping capacitor is electrically connected between the central point and a positive terminal of the DC source. The second damping capacitor is electrically connected between the central point and a negative terminal of the DC source. When the rotor rotates around the stator, the three-phase winding set generates a current passing through the first freewheeling diode of one of the freewheeling diode sets to charge the first damping capacitor, and a current passing through the second freewheeling diode of another one of the freewheeling diode sets to charge the second damping capacitor.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before describing this invention in detail, it should be noted herein that throughout this disclosure, when two elements are described as being "coupled in series," "connected in series" or the like, it is merely intended to portray a serial connection between the two elements without necessarily implying that the currents flowing through the two elements are identical to each other and without limiting whether or not an additional element is coupled to a common node between the two elements. Essentially, "a series connection of elements," "a series coupling of elements" or the like as used throughout this disclosure should be interpreted as being such when looking at those elements alone.

Figure 1:
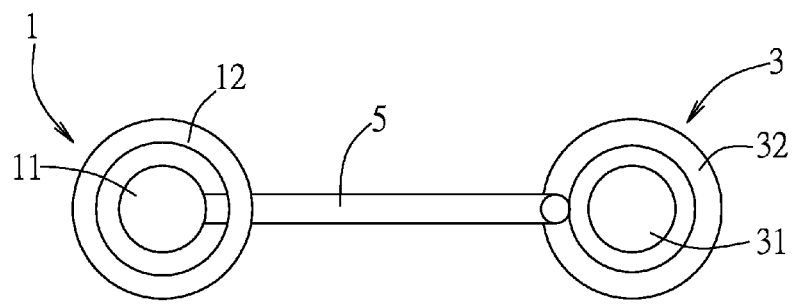
FIG. 1 is a schematic diagram illustrating an embodiment of the dynamic inductor system applied to a brushless DC motor according to the disclosure.
Figure 2:
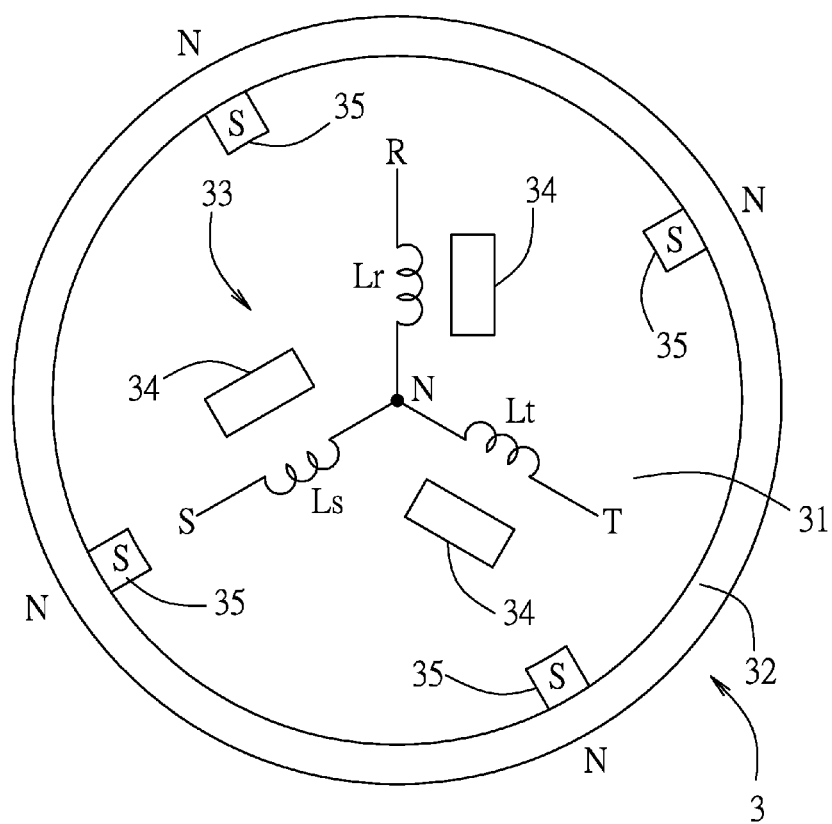
FIG. 2 is a schematic diagram illustrating a stator and a rotor of the dynamic inductor system.
Figure 3:
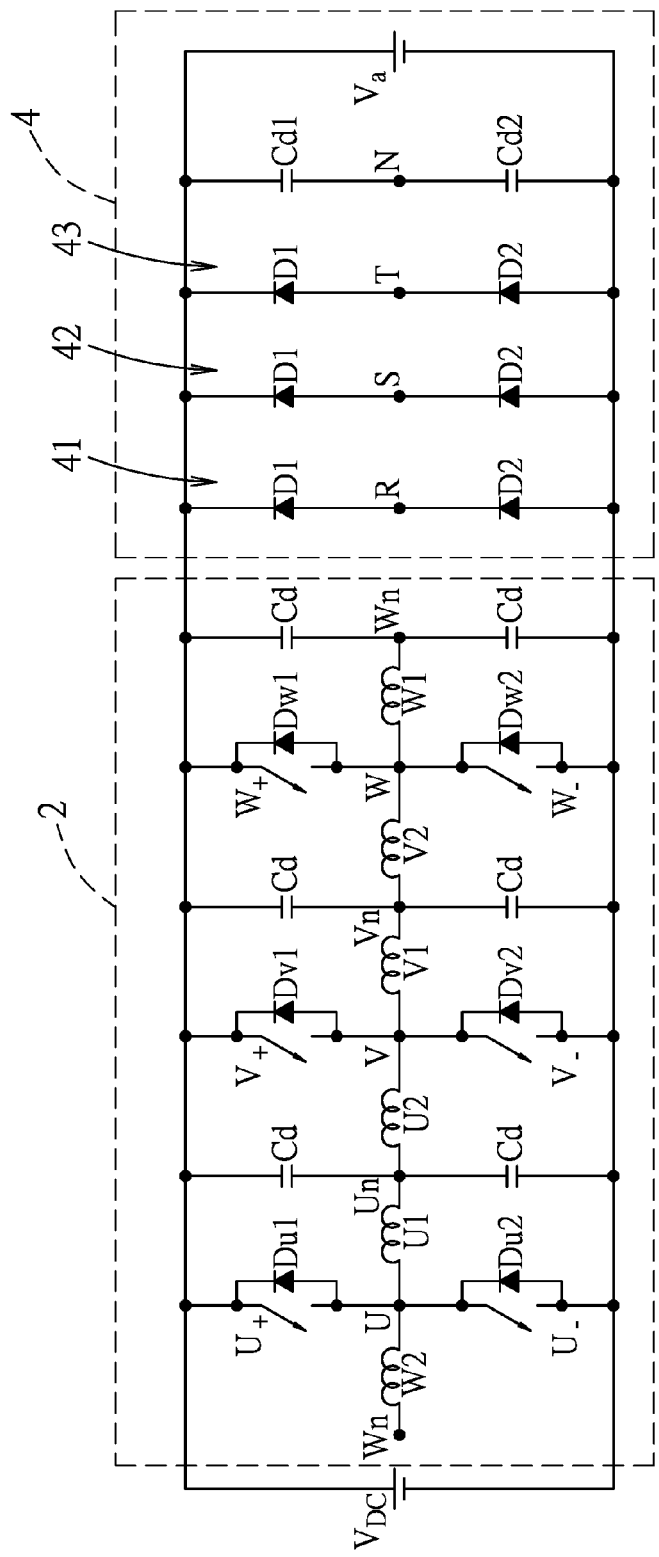
FIG. 3 is a circuit diagram illustrating a damping circuit of the embodiment electrically connected to a driving circuit of the brushless DC motor according to the disclosure.

FIGS. 1 to 3 shows an embodiment of a dynamic inductor system 3 that is capable of storing usable electrical energy according to this disclosure. In this embodiment, the dynamic inductor system 3 is driven by a brushless direct current (BLDC) motor 1 through a shaft 5.

The BLDC motor 1 has a rotor 11, a stator 12, a three-phase winding set 13 (see FIG. 4) and a driving circuit 2. The rotor 11 is configured to rotate around the stator 12. The three-phase winding set 13 is disposed at the stator 12, and includes three coils (Lu, Lv, Lw) that are electrically connected to each other in a delta ($\Delta$) circuit configuration having three end points (U, V, W). The coil (Lu) has two segments (U1, U2) electrically connected to each other at a center point (Un), the coil (Lv) has two segments (V1, V2) electrically connected to each other at a center point (Vn), and the coil (Lw) has two segments (W1, W2) electrically connected to each other at a center point (Wn).

The driving circuit 2 is electrically connected to a DC source ($V_{DC}$) in parallel. The driving circuit 2 includes three bridge arms (i.e., a U-phase arm, a V-phase arm and a W-phase arm), and three pairs of damping capacitors (Cd) (i.e., six damping capacitors (Cd)). Each of the bridge arms is electrically connected to the DC source ($V_{DC}$) in parallel, and includes a first switch ($U_+$, $V_+$, $W_+$), a second switch ($U_-$, $V_-$, $W_-$), a first freewheeling diode (Du1, Dv1, Dw1), and a second freewheeling diode (Du2, Dv2, Dw2).

In each of the bridge arms, the first switch ($U_+$, $V_+$, $W_+$) and the second switch ($U_-$, $V_-$, $W_-$) are electrically connected to each other in series at a common node, and are electrically connected between a positive terminal and a negative terminal of the DC source ($V_{DC}$). The first freewheeling diode (Du1, Dv1, Dw1) is electrically connected to the first switch ($U_+$, $V_+$, $W_+$) in parallel, and has a cathode electrically connected to the positive terminal of the DC source ($V_{DC}$), and an anode electrically connected to the common node. The second freewheeling diode (Du2, Dv2, Dw2) is electrically connected to the second switch ($U_-$, $V_-$, W_) in parallel, and has an anode electrically connected to the negative terminal of the DC source ($V_{DC}$), and a cathode electrically connected to the common node.

Each of the coils (Lu, Lv, Lw) is electrically connected between a respective corresponding pair of the bridge arms. In particular, the coil (Lu) is electrically connected between the U-phase arm and the V-phase arm, the coil (Lv) is electrically connected between the V-phase arm and the W-phase arm, and the coil (Lw) is electrically connected between the W-phase arm and the U-phase arm. Each of the end points (U, V, W) of the delta circuit configuration of the coils (Lu, Lv, Lw) is electrically connected to the common node of the first switch ($U_+$, $V_+$, $W_+$) and the second switch ($U_-$, $V_-$, $W_-$) of a respective one of the bridge arms.

The damping capacitors (Cd) of each pair are electrically connected to each other in series at the center point (Un, Vn, Wn) of the segments (U1 and U2, V1 and V2, W1 and W2) of a respective one of the coils (Lu, Lv, Lw). In each pair, one of the damping capacitors (Cd) is electrically connected between the positive terminal of the DC source ($V_{DC}$) and the center point (Un, Vn, Wn), and the other one of the damping capacitors (Cd) is electrically connected between the negative terminal of the DC source ($V_{DC}$) and the center point (Un, Vn, Wn). The detailed configuration of the BLDC motor 1 is disclosed, for example, in Taiwanese Utility Model Patent No. M465724, the disclosure of which is incorporated herein by reference.

The dynamic inductor system 3 of this embodiment includes a stator 31, a rotor 32, a three-phase winding set 33, four magnets 35 and a damping circuit 4.

The three-phase winding set 33 is disposed at the stator 31, and includes three coils (Lr, Lt, Ls) and three ferromagnetic cores 34. The coils (Lr, Lt, Ls) are electrically connected to each other in a Y circuit configuration that has a central point (N) and three end points (R, S, T). Each of the ferromagnetic cores 34 is wound by a respective one of the coils (Lr, Lt, Ls). It should be noted that FIG. 2 shows an equivalent schematic diagram of the ferromagnetic cores 34 wound respectively by the coils (Lr, Lt, Ls), and does not show actual appearance of the three-phase winding set 33. Each of the ferromagnetic cores 34 cooperates with the respective one of the coils (Lr, Lt, Ls) to act as a damping inductor. The detailed structure and property of the damping inductor are disclosed in, for example, Taiwanese Utility Model Patent No. M470365, the disclosure of which is incorporated herein by reference. In other embodiments, the three-phase winding set 33 can be disposed at and co-rotate with the rotor 32, and output electricity generated by the coils (Lr, Lt, Ls) with a brush.

The four magnets 35 are permanent magnets, are disposed at the rotor 32, and are spaced apart from each other.

The rotor 32 is configured to rotate around the stator 31, and is connected to the rotor 11 of the BLDC motor 1 through the shaft 5, such that the rotor 11 drives the rotor 32 to rotate when the rotor 11 rotates. In this embodiment, the rotor 32 surrounds the stator 31.

Referring to FIG. 3, the damping circuit 4 includes three freewheeling diode sets (i.e., an R-phase freewheeling diode set 41, an S-phase freewheeling diode set 42 and a T-phase freewheeling diode set 43), a first damping capacitor (Cd1), a second damping capacitor (Cd2) and an electrochemical cell ($V_a$). Each of the freewheeling diode sets 41-43 is electrically connected to the DC source ($V_{DC}$) in parallel, and includes a first freewheeling diode (D1) and a second freewheeling diode (D2) that are electrically connected to each other in series at a common node. The end points (R, S, T) of the Y circuit configuration of the coils (Lr, Lt, Ls) are electrically connected to the R-, S- and T-phase freewheeling diode sets 41-43, respectively. In particular, each of the end points (R, S, T) is electrically connected to the common node of the first and second freewheeling diodes (D1, D2) of a respective one of the S- and T-phase freewheeling diode sets 41-43. In each of the freewheeling diode sets 41-43, the first freewheeling diode (D1) has a cathode electrically connected to the positive terminal of the DC source ($V_{DC}$), and an anode electrically connected to a cathode of the second freewheeling diode (D2), and the second freewheeling diode (D2) further has an anode electrically connected to the negative terminal of the DC source ($V_{DC}$).

The first damping capacitor (Cd1) is electrically connected between the central point (N) of the Y circuit configuration and the positive terminal of the DC source ($V_{DC}$), and the second damping capacitor (Cd2) is electrically connected between the central point (N) and the negative terminal of the DC source ($V_{DC}$). The detailed structure and property of the first and second damping capacitors (Cd1, Cd2) are disclosed in, for example, Taiwanese Utility Model Patent No. M477033, the disclosure of which is incorporated herein by reference.

The electrochemical cell ($V_a$) is electrically connected to the DC source ($V_{DC}$) in parallel, and has a positive terminal electrically connected to the positive terminal of the DC source ($V_{DC}$), and a negative terminal electrically connected to the negative terminal of the DC source ($V_{DC}$). The electrochemical cell ($V_a$) can charge the DC source ($V_{DC}$) which, in this embodiment, is a rechargeable battery.

Figure 5:
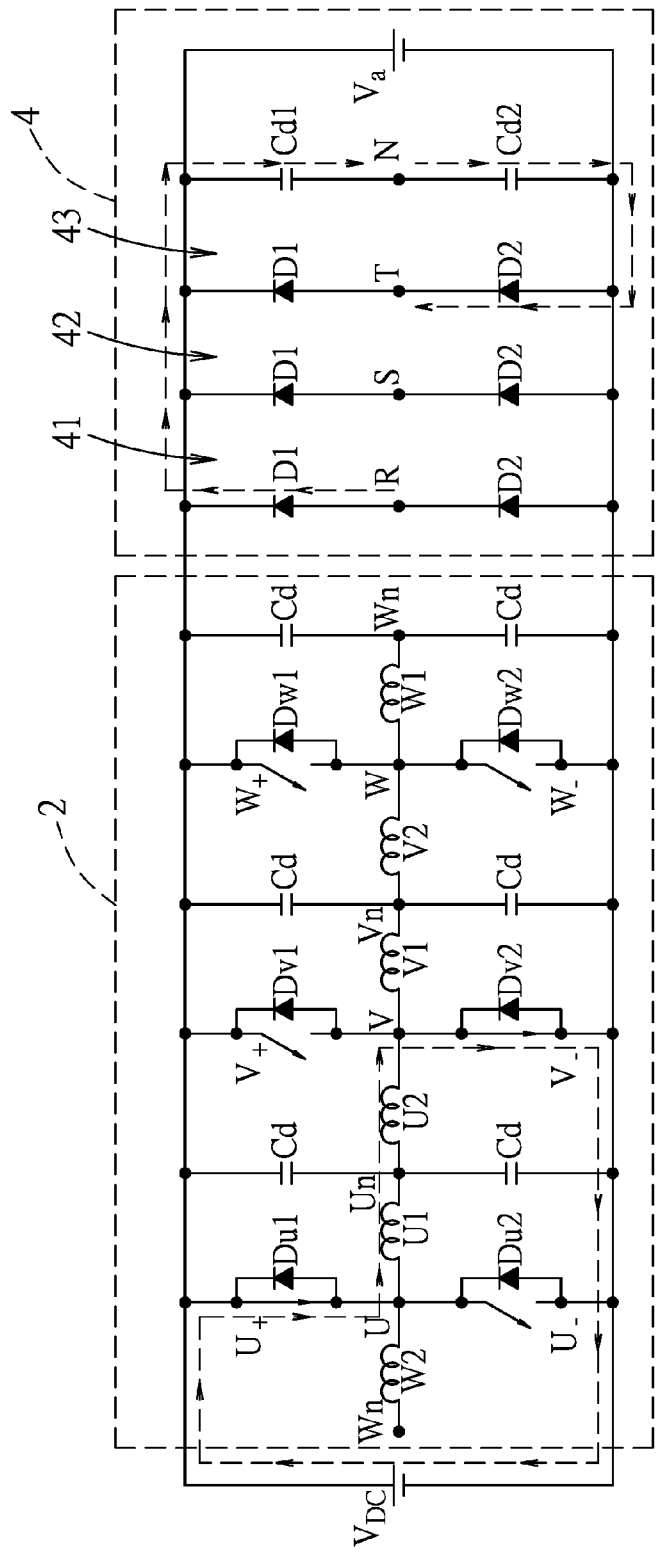
FIG. 5 is a circuit diagram illustrating operation of the damping circuit and the driving circuit during magnetization of a coil of the brushless DC motor.
Figure 6:
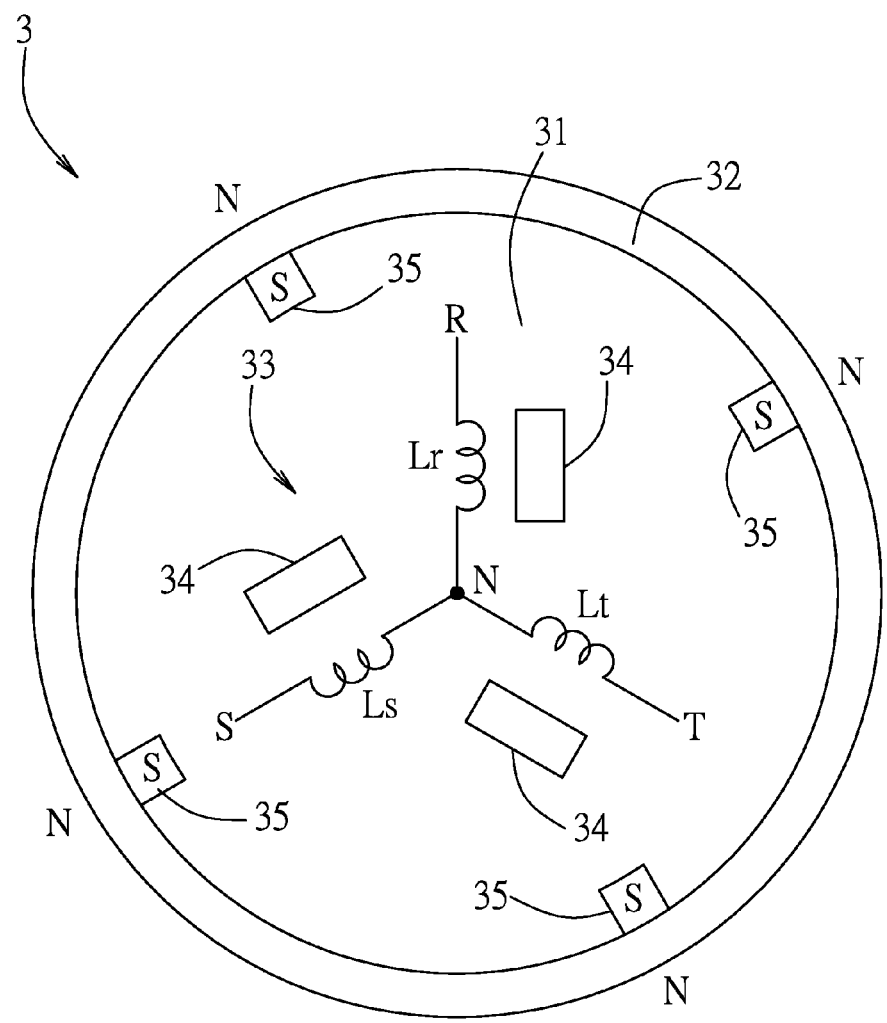
FIG. 6 is a schematic diagram illustrating the three-phase winding set of the dynamic inductor system of the embodiment generating currents according to this disclosure.

Further referring to FIGS. 5 and 6, when the first switch ($U_+$) of the U-phase arm and the second switch ($V_-$) of the V-phase arm of the driving circuit 2 are both switched on, the coil (Lu) is electrically connected to the DC source ($V_{DC}$) and is magnetized so as to generate a magnetic force for driving the rotor 11 of the BLDC motor 1 to rotate. Similarly, the coils (Lu, Lv, Lw) are continuously sequentially magnetized for driving the rotor 11 to continuously rotate. At this time, the rotor 32 of the dynamic inductor system 3 is driven to rotate by the rotor 11 through the shaft 5. Then, the coils (Lr, Lt, Ls), which are disposed at the stator 31, generate induction currents when the rotator 32, which the magnets 35 are disposed at, rotates around the stator 31.

For example, when the coils (Lr, Lt) are exposed to time varying magnetic fields attributed to the magnets 35, the coil (Lr) generates an induction current flowing from the end point (R) to the central point (N), and the coil (Lt) generates an induction current flowing from the central point (N) to the end point (T). The induction current generated by the coil (Lr) flows from the end point (R) through the first freewheeling diode (D1) of R-phase freewheeling diode set 41 and the first damping capacitor (Cd1) to the central point (N) so as to charge the damping capacitor (Cd1). The induction current generated by the coil (Lt) flows from the central point (N) through the second damping capacitor (Cd2) and the second freewheeling diode (D2) of the T-phase freewheeling diode set 43 to the end point (T) so as to charge the second damping capacitor (Cd2). The first and second damping capacitors (Cd1, Cd2) charge the electrochemical ceil ($V_a$) when voltage value of the electrochemical cell ($V_a$) is lower than voltage value of the DC source ($V_{DC}$). Then, when the voltage value of the electrochemical cell ($V_a$) is higher than the voltage value of the DC source ($V_{DC}$), the electrochemical cell ($V_a$) charges the DC source ($V_{DC}$).

Figure 4:
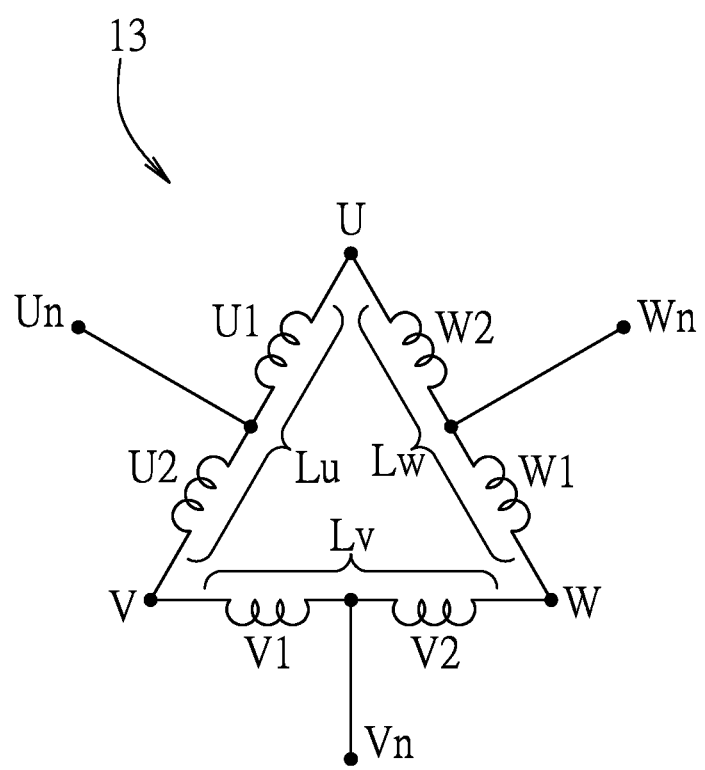
FIG. 4 is a schematic diagram illustrating a three-phase winding set of the brushless DC motor.
Figure 7:
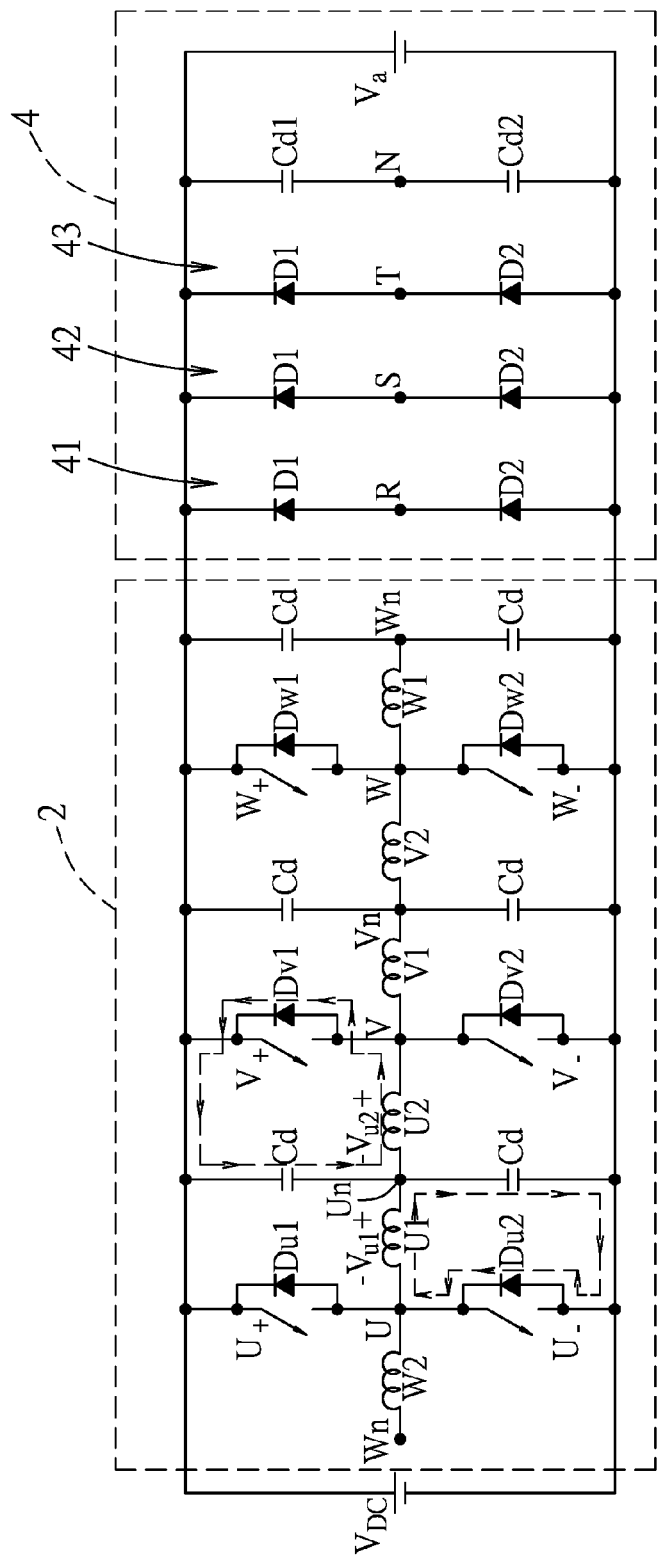
FIG. 7 is a circuit diagram illustrating operation of the driving circuit during demagnetization of the coil.

Referring to FIGS. 4 and 7, once the driving circuit 2 stops magnetizing the coil (Lu), the segment (U1) of the coil (Lu) generates, due to counter-electromotive force (Vu1), a current flowing through the second freewheeling diode (Du2) of the U-phase arm to charge the damping capacitor (Cd) connected between the negative terminal of the DC source ($V_{DC}$) and the center point (Un), and the segment (U2) of the coil (Lu) generates, due to counter-electromotive force (Vu2), a current flowing through the first freewheeling diode (Dv1) of the V-phase arm to charge the damping capacitor (Cd) connected between the positive terminal of the DC source ($V_{DC}$) the center point (Un).

Energy of the counter-electromotive force generated at the coils (Lu, Lv, Lw) can be stored in the damping capacitors (Cd) of the driving circuit 2. However, since the voltage value of each pair of the damping capacitors (Cd) is usually lower than the voltage value of the DC source ($V_{DC}$), the damping capacitors (Cd) cannot directly charge the DC source ($V_{DC}$). The series connection of the first and second damping capacitors (Cd1, Cd2) of the damping circuit 4 is electrically connected to each pair of the damping capacitors (Cd) of the driving circuit 2 in parallel, and the voltage value of the series connection of the first and second damping capacitors (Cd1, Cd2) of the damping circuit 4 is always greater than the voltage value of the DC source ($V_{DC}$) during operation of the damping circuit 4. As a result, by virtue of the first and second damping capacitors (Cd1, Cd2), the voltage value of each pair of the damping capacitors (Cd) of the driving circuit 2 can be increased to be substantially equal the voltage value of the series connection of the first and second damping capacitors (Cd1, Cd2), such that the damping capacitors (Cd) of the driving circuit 2 can charge the DC source ($V_{DC}$) and the energy of the counter-electromotive force can be recycled.

It should be noted that the currents generated by the coils (Lu, Lv, Lw) of the driving circuit 2 due to the counter-electromotive force are high-frequency alternating currents (AC), and the induction currents generated by the coils (Lr, Ls, Lt) are low-frequency AC. The high-frequency AC and the low-frequency AC are stored in the damping capacitors (Cd, Cd1, Cd2) and the electrochemical cell ($V_a$) that provide direct currents, achieving damping effect.

The energy stored by an inductor is equal to an amount of work required to establish a current through the inductor, and is expressed by:

$$E = \frac{1}{2}LI^2$$

where L is inductance of the inductor, and 1 is ampere value of the current through the inductor. From the above equation, when the dynamic inductor system 3 generates the induction current and the ampere value of the induction current is increased, the value of the inductance (L) is decreased. The dynamic inductor system 3 acts as a dynamic damping inductor since the value of the inductance (L) is variable. In this embodiment, the dynamic inductor system 3 is not used as a generator despite the structure thereof being similar to a generator, and thus does not result in additional load.

It should be noted that the dynamic inductor system 3 of this embodiment according to this disclosure is applicable to an electric vehicle, for example, an electric motorcycle. In this case, the BLDC motor 1 is used as a drive motor to drive a wheel shaft of the electric motorcycle, and the energy stored in the damping capacitors (Cd) of the driving circuit 2 and the first and second damping capacitors (Cd1, Cd2) of the damping circuit 4 can be used to charge the DC source ($V_{DC}$), for example, a rechargeable battery of the electric motorcycle. As a result, duration that the DC source ($V_{DC}$) is capable of supplying electrical energy is increased, and thus, endurance of the electric motorcycle is also increased.

Further, the driving circuit 2 is configured to output energy in voltage attributed to the counter-electromotive force, and the dynamic inductor system 3 is configured to output energy in current. Thus, electric power is increased, and performance of the electric motorcycle is increased accordingly.

In sum, by virtue of the first and second freewheeling diodes (Du1, Dv1, Dw1, Du2, Dv2, Dw2) forming a path for the current to the damping capacitor(s) (Cd), the energy of the counter-electromotive force caused by the coils (Lu, Lv, Lw) can be stored in the damping capacitors (Cd), preventing the driving circuit 2 from generating high temperature. Accordingly, the DC source ($V_{DC}$) will not be exposed to high temperature, and service life thereof will not be affected. More, the first and second damping capacitors (Cd1, Cd2) of the damping circuit 4 are configured to charge the damping capacitors (Cd) of the driving circuit 2 so as to increase the voltage value of each pair of the damping capacitors (Cd) of the driving circuit 2. Accordingly, the damping capacitors (Cd) of the driving circuit 2 can charge the DC source ($V_{DC}$) and the energy of the counter-electromotive force can be recycled.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:
1. A dynamic inductor system capable of storing usable electrical energy, said device comprising:
  a rotor;
  a stator;
  a three-phase winding set disposed at one of said rotor and said stator and including three coils, said coils being electrically connected to each other in a Y circuit configuration that has a central point and three end points; and
  a damping circuit including
    three freewheeling diode sets each configured to be electrically connected to a direct current (DC) source in parallel, each of said freewheeling diode sets having a first freewheeling diode and a second freewheeling diode electrically connected to each other in series at a common node that is electrically connected to a respective one of said end points,
    a first damping capacitor electrically connected between said central point and a positive terminal of the DC source, and
    a second damping capacitor electrically connected between said central point and a negative terminal of the DC source;
  wherein, when said rotor rotates around said stator, said three-phase winding set generates a current passing through said first freewheeling diode of one of said freewheeling diode sets to charge said first damping capacitor, and a current passing through said second freewheeling diode of another one of said freewheeling diode sets to charge said second damping capacitor.

2. The dynamic inductor system as claimed in claim 1, further comprising at least three magnets disposed at the other one of said rotor and said stator,
   wherein said three-phase winding set further includes three ferromagnetic cores each wound by a respective one of said coils and cooperating with said respective one of said coils to act as a damping inductor.

3. The dynamic inductor system as claimed in claim 2, wherein said three-phase winding set is disposed at said stator, said at least three magnets are disposed at said rotor, and said rotor is disposed around said stator and is configured to rotate around said stator.

4. The dynamic inductor system as claimed in claim 1, the DC source being a rechargeable battery,
   wherein said damping circuit further includes an electrochemical cell configured to be electrically connected to the DC source in parallel, to be charged by said damping capacitors, and to charge the DC source.

5. The dynamic inductor system as claimed in claim 1, wherein said first freewheeling diode of each of said freewheeling diode sets has a cathode configured to be electrically connected to the positive terminal of the DC source, and an anode,
   wherein said second freewheeling diode of each of said freewheeling diode sets has an anode configured to be electrically connected to the negative terminal of the DC source, and a cathode electrically connected to the anode of said first freewheeling diode.

* * * * *